(12) United States Patent
Fujii

(10) Patent No.: US 10,182,209 B2
(45) Date of Patent: *Jan. 15, 2019

(54) INFORMATION PROCESSING APPARATUS, INFORMATION PROCESSING METHOD, PROGRAM, AND SERVER

(71) Applicant: SONY CORPORATION, Tokyo (JP)

(72) Inventor: Hiromitsu Fujii, Tokyo (JP)

(73) Assignee: SONY CORPORATION, Tokyo (JP)

( * ) Notice: Subject to any disclaimer, the term of this patent is extended or adjusted under 35 U.S.C. 154(b) by 119 days.

This patent is subject to a terminal disclaimer.

(21) Appl. No.: 14/645,718

(22) Filed: Mar. 12, 2015

(65) Prior Publication Data

US 2015/0237307 A1     Aug. 20, 2015

Related U.S. Application Data

(63) Continuation of application No. 13/524,449, filed on Jun. 15, 2012, now Pat. No. 8,988,490.

(30) Foreign Application Priority Data

Jun. 23, 2011   (JP) ................................. 2011-139219

(51) Int. Cl.

| | | |
|---|---|---|
| *H04N 7/14* | (2006.01) | |
| *H04N 7/15* | (2006.01) | |
| *H04L 12/18* | (2006.01) | |
| *H04L 12/58* | (2006.01) | |

(52) U.S. Cl.
CPC .......... *H04N 7/157* (2013.01); *H04L 12/1827* (2013.01); *H04L 51/10* (2013.01)

(58) Field of Classification Search
CPC ...... H04L 12/1827; H04L 51/10; H04N 7/157

USPC .... 348/14.01–14.16; 370/259–271, 351–357
See application file for complete search history.

(56) References Cited

U.S. PATENT DOCUMENTS

| | | | |
|---|---|---|---|
| 6,522,333 B1* | 2/2003 | Hatlelid | G06T 13/40 |
| | | | 345/473 |
| 6,876,728 B2 | 4/2005 | Kredo et al. | |
| 7,564,476 B1* | 7/2009 | Coughlan | H04N 7/147 |
| | | | 348/14.01 |
| 8,670,018 B2* | 3/2014 | Cunnington | G06Q 10/10 |
| | | | 348/14.08 |
| 8,988,490 B2* | 3/2015 | Fujii | H04L 12/1827 |
| | | | 348/14.11 |
| 2002/0128033 A1 | 9/2002 | Burgess | |
| 2004/0107251 A1* | 6/2004 | Wat | H04L 12/1813 |
| | | | 709/204 |
| 2008/0059570 A1* | 3/2008 | Bill | G06Q 10/10 |
| | | | 709/203 |

(Continued)

FOREIGN PATENT DOCUMENTS

JP     2009-5239     1/2009

*Primary Examiner* — Hemant S Patel
(74) *Attorney, Agent, or Firm* — Haug Partners LLP; William S. Frommer

(57) ABSTRACT

An information processing apparatus according to an embodiment of the present technology includes a generation unit and a first transmission unit. The generation unit generates parameter information that shows states of a user. The first transmission unit transmits the generated parameter information through a network to an information processing apparatus of a communication partner capable of generating an image that reflects the state of the user on the basis of the parameter information.

23 Claims, 16 Drawing Sheets

(56) References Cited

U.S. PATENT DOCUMENTS

| | | | |
|---|---|---|---|
| 2008/0182566 A1 | 7/2008 | Camp, Jr. | |
| 2008/0254829 A1* | 10/2008 | Kano | H04N 7/147 455/556.1 |
| 2009/0002479 A1* | 1/2009 | Sangberg | H04N 7/147 348/14.02 |
| 2009/0300525 A1* | 12/2009 | Jolliff | H04M 1/72544 715/764 |
| 2009/0315974 A1* | 12/2009 | Matthews | H04N 7/144 348/14.08 |
| 2010/0085414 A1* | 4/2010 | Eun | H04N 7/14 348/14.02 |
| 2010/0257462 A1* | 10/2010 | Barrett | H04N 7/147 715/756 |
| 2011/0029893 A1 | 2/2011 | Roberts et al. | |
| 2011/0043602 A1* | 2/2011 | Lee | G06F 9/543 348/14.09 |
| 2011/0298827 A1* | 12/2011 | Perez | G06K 9/00355 345/647 |
| 2011/0304629 A1* | 12/2011 | Winchester | G06T 13/40 345/473 |
| 2013/0316684 A1* | 11/2013 | Cho | H04W 4/16 455/415 |

* cited by examiner

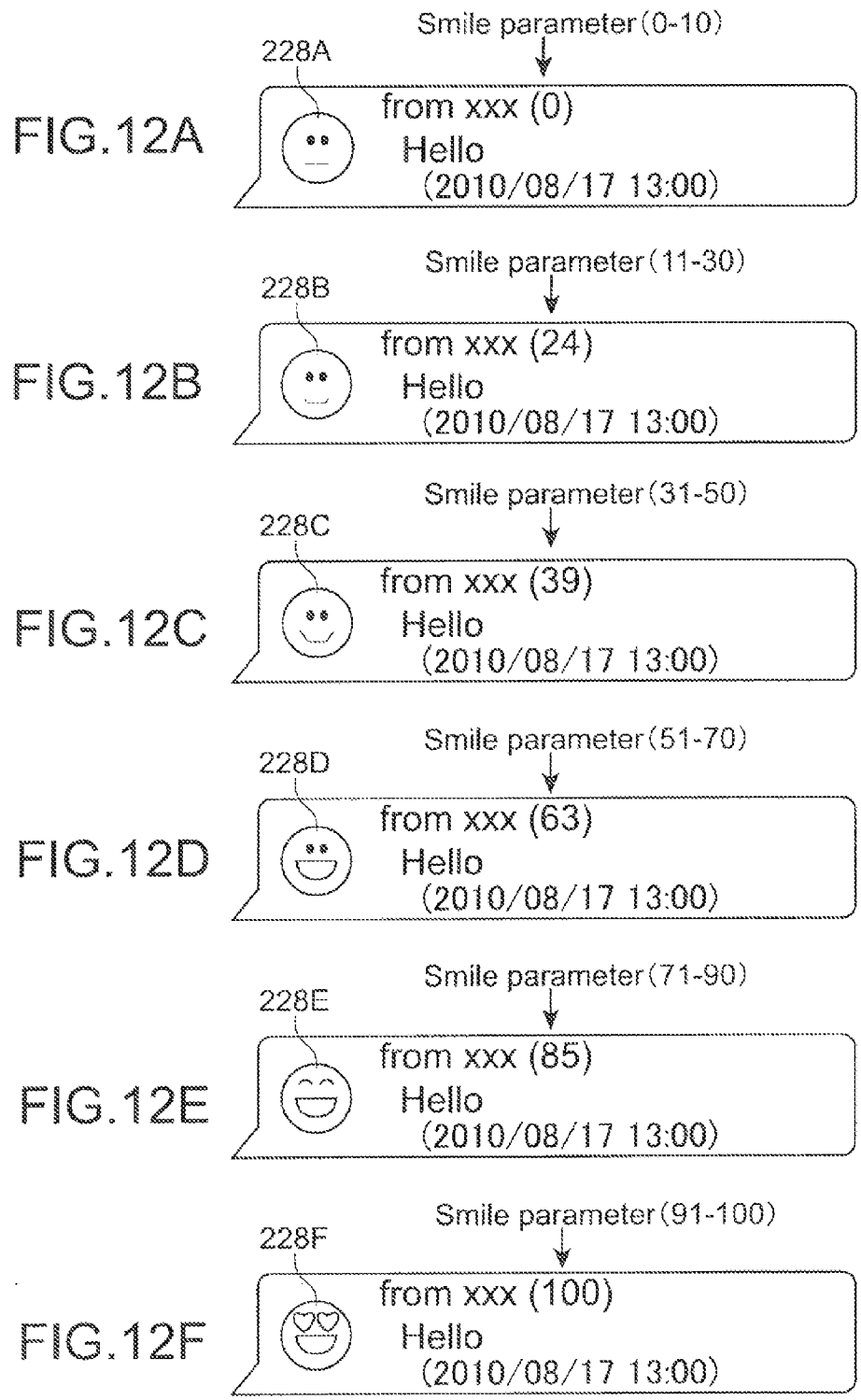

| Measurement information | State of user | | Parameter information |
|---|---|---|---|
| Face image | Emotional state | Smiling | Parameter A |
| | | Angry | Parameter B |
| | | Crying | Parameter C |
| Position information | Moving state | Sitting | Parameter D |
| | | Walking | Parameter E |
| | | Train | Parameter F |
| Preference information | Preference | Fashion | Parameter G |
| | | Sports | Parameter H |
| | | Gourmet | Parameter I |

FIG.15

INFORMATION PROCESSING APPARATUS, INFORMATION PROCESSING METHOD, PROGRAM, AND SERVER

BACKGROUND

The present technology relates to an information processing apparatus, an information processing method, a program, and a server that are capable of performing information communication through a network.

In recent years, Internet services such as Internet phones, remote TV conferences, and video chat have become widespread. For example, a chat system using video and audio streams is described in Japanese Patent Application Laid-open No. 2009-5239 (hereinafter, referred to as Patent Document 1). In such a chat system, face images and voices of users in remote locations are mutually transmitted through a network. By reproducing moving images and voices in terminals of the users, real time communication is realized, in which the users feel as if they are in the same place.

SUMMARY

Portable terminals with a camera have also become widespread and such portable terminals are sometimes used for video chat and the like. In this case, with the chat system described in Patent Document 1, there is a fear that communication traffic may significantly increase due to transmission/reception of face images and voices of users. Thus, communication load on the network can increase, which may impose a financial burden on the users in some charging systems.

In view of the above-mentioned circumstances, it is desirable to provide an information processing apparatus, an information processing method, a program, and a server that are capable of realizing satisfactory communication while suppressing communication traffic.

An information processing apparatus according to an embodiment of the present technology includes a generation unit and a first transmission unit.

The generation unit generates parameter information that shows a state of a user.

The first transmission unit transmits the generated parameter information through a network to an information processing apparatus of a communication partner capable of generating an image that reflects the state of the user on the basis of the parameter information.

In the information processing apparatus, the parameter information that shows the state of the user is generated. Then, the parameter information is transmitted through a network to the information processing apparatus of the communication partner. The information processing apparatus of the communication partner is capable of generating an image that reflects the state of the user on the basis of the received parameter information. In this manner, satisfactory communication can be realized while suppressing communication traffic by using the parameter information that shows the state of the user.

The information processing apparatus may further include an acquisition unit configured to acquire measurement information generated by measuring the state of the user. In this case, the generation unit may generate the parameter information on the basis of the measurement information.

In this manner, the measurement information generated by measuring the state of the user may be acquired. The satisfactory communication can be realized while suppressing the communication traffic by using the parameter information generated on the basis of the measurement information.

The acquisition unit may acquire a face image of the user as the measurement information. In this case, the generation unit may generate the parameter information on the basis of the face image.

In this manner, the face image of the user may be acquired as the measurement information, and the parameter information may be generated on the basis of the measurement information. With this configuration, the satisfactory communication can be realized.

The acquisition unit may acquire position information of the user as the measurement information. In this case, the generation unit may generate the parameter information on the basis of the position information.

In this manner, the position information of the user may be acquired as the measurement information, and the parameter information may be generated on the basis of the measurement information. With this configuration, the satisfactory communication can be realized.

The acquisition unit may acquire preference information of the user as the measurement information. In this case, the generation unit may generate the parameter information on the basis of the preference information.

In this manner, the preference information of the user is acquired as the measurement information, and the parameter information may be generated on the basis of the measurement information. With this configuration, the satisfactory communication can be realized.

The information processing apparatus may further include a second transmission unit configured to transmit the acquired measurement information through the network to a server capable of generating the parameter information on the basis of the measurement information and transmitting through the network to the information processing apparatus of the communication partner.

In this case, the first transmission unit may transmit the parameter information through the server to the information processing apparatus of the communication partner.

The information processing apparatus may further include a switching unit configured to switch between transmission of the parameter information by the first transmission unit and transmission of the measurement information by the second transmission unit.

The information processing apparatus includes the first transmission unit configured to transmit the parameter information and the second transmission unit configured to transmit the measurement information. The first transmission unit and the second transmission unit are switched to each other. For example, when a communication line of a network line used by the information processing apparatus is thick (bandwidth is wide) and a communication load causes no problem, the measurement information is transmitted to a server. Then, the parameter information is generated by the server on the basis of the measurement information. With this configuration, a processing load of the information processing apparatus can be reduced.

An information processing apparatus according to another embodiment of the present technology includes a network connection unit and an information processing unit.

The network connection unit is capable of connecting through a network to an information processing apparatus of a communication partner capable of generating parameter information that shows a state of a user and transmitting the parameter information.

The information processing unit is capable of receiving the parameter information transmitted from the information processing apparatus of the communication partner connected through the network by the network connection unit and generating an image that reflects the state of the user on the basis of the parameter information.

A server according to an embodiment of the present technology includes a network connection unit, a first transmission unit, a generation unit, and a second transmission unit.

The network connection unit is capable of connecting through a network to a first information processing apparatus capable of transmitting parameter information that shows a state of a user and measurement information generated by measuring the state of the user and to a second information processing apparatus capable of generating an image that reflects the state of the user on the basis of the parameter information.

The first transmission unit transmits the parameter information transmitted from the first information processing apparatus connected through the network connection unit to the second information processing apparatus connected through the network connection unit.

The generation unit generates the parameter information on the basis of the measurement information transmitted from the first information processing apparatus connected through the network connection unit. The second transmission unit transmits the generated parameter information to the second information processing apparatus connected through the network connection unit.

An information processing method according to an embodiment of the present technology includes generating, by a generation unit, parameter information that shows a state of a user.

The generated parameter information is transmitted by a transmission unit through a network to an information processing apparatus of a communication partner capable of generating an image that reflects the state of the user on the basis of the parameter information.

A program according to an embodiment of the present technology causes a computer to function as a generation unit and a first transmission unit.

The generation unit generates parameter information that shows a state of a user.

The first transmission unit transmits the generated parameter information through a network to an information processing apparatus of a communication partner capable of generating an image that reflects the state of the user on the basis of the parameter information.

As described above, according to the present technology, the satisfactory communication can be realized while suppressing the communication traffic.

These and other objects, features and advantages of the present disclosure will become more apparent in light of the following detailed description of best mode embodiments thereof, as illustrated in the accompanying drawings.

BRIEF DESCRIPTION OF DRAWINGS

FIGS. 12A to 12F are schematic diagrams showing examples of user state images generated on the basis of parameter information relating to expressions and emotional states of a user;

FIG. 15 is a table for explaining a modification example of the parameter information that shows states of a user;

DETAILED DESCRIPTION OF EMBODIMENTS

Hereinafter, an embodiment of the present technology will be described with reference to the drawings.

[Structure of Network System]

Figure 1:
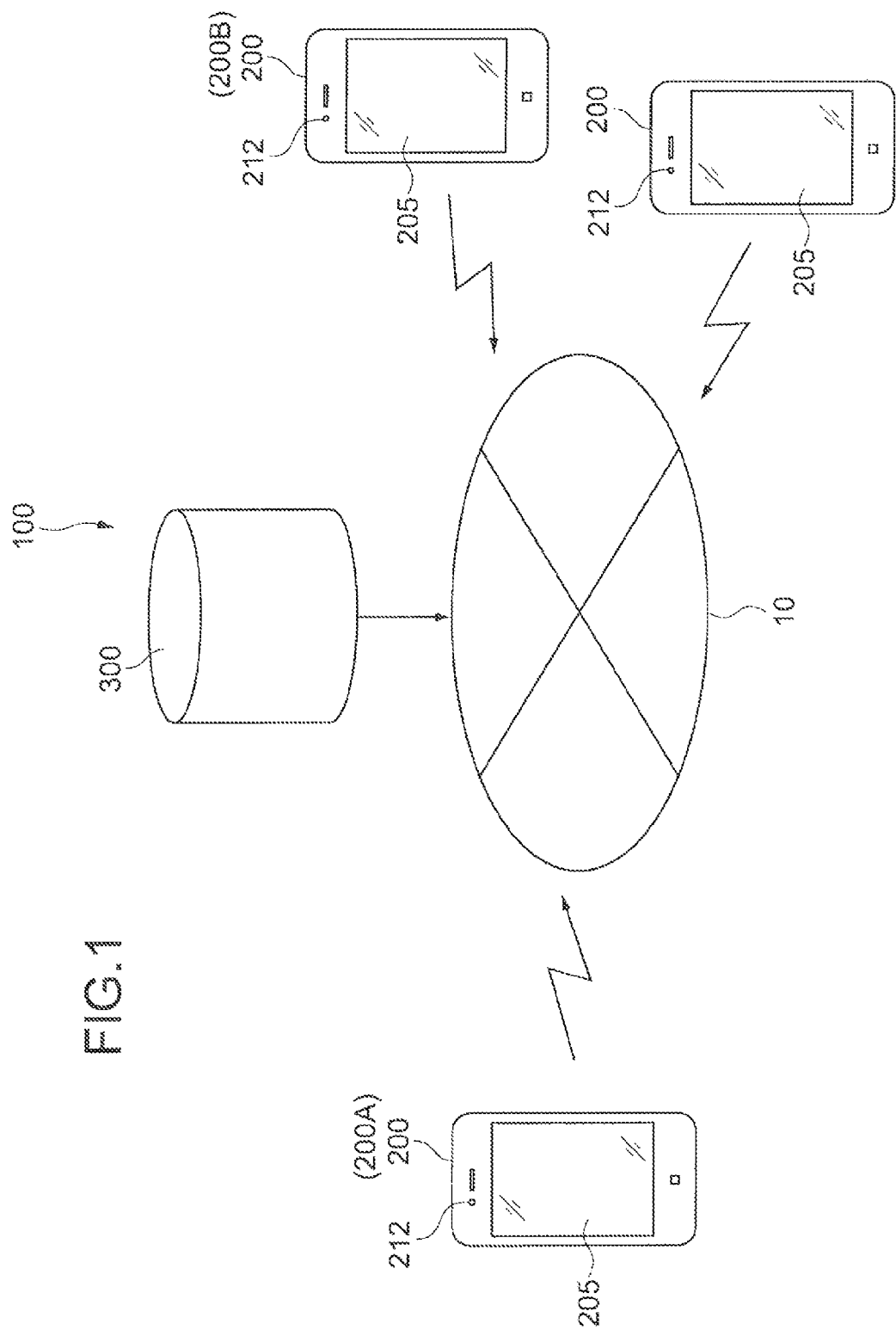
FIG. 1 is a schematic diagram showing a network system according to an embodiment of the present technology.

FIG. 1 is a schematic diagram showing a network system according to an embodiment of the present technology. A network system 100 includes a network 10, a plurality of portable terminals 200 connected to the network 10, and a server 300 connected to the network 10. The plurality of portable terminals 200 each correspond to an information processing apparatus according to this embodiment.

In this embodiment, the Internet is taken as an example of the network 10. As the network 10, however, such networks as WAN (Wide Area Network), LAN (Local Area Network), and a home network may also be used. Also, there is no limitation on a protocol to construct a network. For example, TCP/IP (Transmission Control Protocol/Internet Protocol) is used as a standard protocol.

[Hardware Structure of Portable Terminal]

Figure 2:
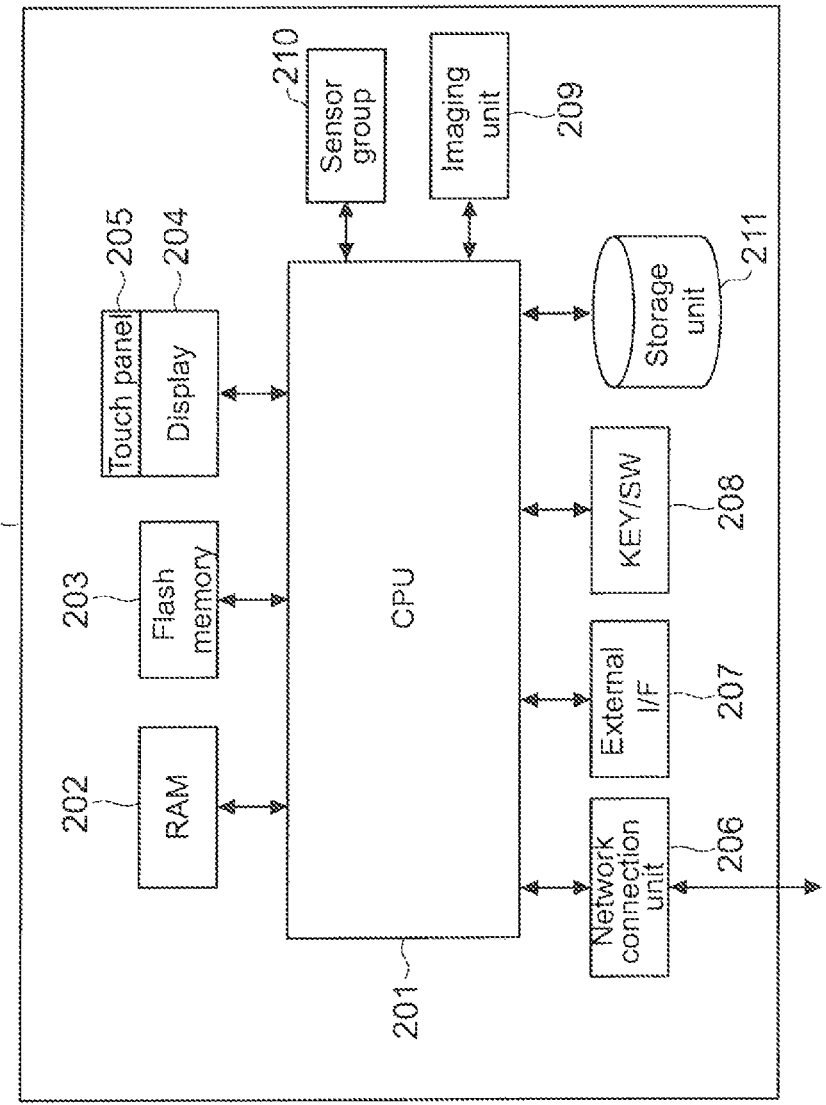
FIG. 2 is a block diagram showing an example of a hardware structure of a portable terminal shown in FIG. 1.

FIG. 2 is a block diagram showing an example of a hardware structure of the portable terminal 200 according to this embodiment.

The portable terminal 200 includes a CPU (Central Processing Unit) 201, a RAM (Random Access Memory) 202, a flash memory 203, a display 204, a touch panel 205, a network connection unit 206, an external I/F (interface) 207, and a key/switch unit 208. The portable terminal 200 further includes an imaging unit 209, a sensor group 210, and a storage unit 211.

The CPU 201 performs various types of calculation by exchanging signals with the respective blocks of the portable terminal 200 and integrally controls processing performed in the portable terminal 200 such as imaging processing, analysis processing for the imaged image, or calculation processing for position information of a user.

The RAM 202 is used as a work area of the CPU 201. In the RAM 202, for example, various types of data to be processed by the CPU 201 such as an imaged image and a variety of meta-data and a program such as an application are temporarily stored.

The flash memory 203 is, for example, a NAND type flash memory, and stores data necessary for various types of processing, content data such as an imaged image, and various programs such as a control program and an application executed by the CPU 201. When an application is executed, the flash memory 203 reads out the various types of data necessary for the execution to the RAM 202.

The storage unit 211 is a non-volatile memory such as an HDD, a flash memory, and another solid-state memory. The variety of data and the various programs such as an application may be stored in the storage unit 211. In this embodiment, a program associated with a chat application according to this embodiment is stored in the flash memory 203 or the storage unit 211.

The display 204 is, for example, an LCD (Liquid Crystal Display) or an OELD (Organic Electro-Luminescence Display). On the display 204, for example, an imaged image and a thumbnail image thereof are displayed. Also, a GUI (Graphical User Interface) to use the chat system according to this embodiment is displayed on the display 204.

For example, a GUI such as an avatar imitating a user of the portable terminal 200 and text data showing comments of respective users are displayed on the display 204. In addition, various GUIs to operate the portable terminal 200 are displayed on the display 204.

As shown in FIG. 2, the display 204 in this embodiment is integrally provided with the touch panel 205. The touch panel 205 detects touch operation by a user and transmits an input signal to the CPU 201. As an operation system for the touch panel 205, for example, a resistive film system or a capacitance system is used. Another system, however, may also be used.

The network connection unit 206 is an interface for connecting the portable terminal 200 to the Internet that is the network 10. With the network connection unit 206, the portable terminals 200 are allowed to connect to each other through the network 10. The portable terminals 200 and the server 300 are also allowed to connect to each other through the network 10.

The portable terminals 200 according to this embodiment are capable of connecting to the network 10 using a 3rd generation (3G) mobile communication system. In this case, the portable terminals 200 are connected to the network 10 through, for example, a server of a carrier (communication carrier) that provides a 3G network.

The portable terminals 200 are also capable of connecting to the network 10 by wireless LAN communication in accordance with a wireless LAN standard. The wireless LAN standard is, for example, WiFi or WiMAX. For example, the portable terminals 200 are capable of connecting to the network 10 through an access point of a public wireless LAN.

When the portable terminal 200 performs data communication with the server 300 or another portable terminal 200 through the network 10, the communication is arbitrarily switched between data communication using the 3G network and data communication using the wireless LAN communication.

The external I/F 207 is an interface for connecting to an external device on the basis of a standard of, for example, a USB (Universal Serial Bus) or an HDMI (High-Definition Multimedia Interface). With the external I/F 207, various types of data such as an image file can be transmitted/received to/from an external device. The external I/F 207 may also be an interface for connecting, for example, to various memory cards such as a memory stick.

The key/switch unit 208 especially accepts operation by a user that is not able to be input with the touch panel 205 such as operation of a power switch and a short cut key and transmits an input signal to the CPU 201.

The imaging unit 209 includes an imaging control unit, an imaging element, and an imaging optical system that are not shown. As the imaging element, for example, a CMOS (Complementary Metal Oxide Semiconductor) or a CCD (Charge Coupled Devices) sensor is used. The imaging optical system images forms an object image on an imaging surface of the imaging element. The imaging control unit drives the imaging element and performs signal processing of an image signal output from the imaging element on the basis of an instruction from the CPU 201.

As shown in FIG. 1, as the imaging unit 209 in this embodiment, a facing camera 212 is provided on the upper side of the touch panel 205 of the portable terminal 200. With the facing camera 212, a face image of a user using the portable terminal 200 is imaged in real time. In this embodiment, a camera is also provided on the back side of the portable terminal 200.

The sensor group 210 includes at least one sensor capable of calculating real-time position information of a user as measurement information generated by measuring states of the user. As such a sensor, there is a GPS (Global Positioning System) module, an acceleration sensor, a direction sensor, or an angular velocity sensor such as a gyro sensor. The position information of the user may be calculated using an image imaged by, for example, the facing camera 212. In this case, the image is used as the measurement information.

The GPS module calculates the position information of the user on the basis of a GPS signal. In another case, the position information may be calculated on the basis of information on an access point of a wireless LAN existing nearby. At a point where a GPS signal is not able to be received, for example, displacement from a position where the position information can be calculated is calculated by an angular velocity sensor, an acceleration sensor, or the like. The position information of a user may be acquired in such a method.

The direction sensor is a sensor for measuring a direction on the earth using geomagnetism. With the direction sensor, for example, a direction to which an optical axis of the imaging unit 209 faces can be detected. A barometer, which is not shown, may be provided to the portable terminal 200 to generate altitude information by measuring altitude with the barometer. Furthermore, any other sensors capable of acquiring information relating to a position of the user may be installed to the portable terminal 200 as the sensor group 210.

As the portable terminal 200, for example, a portable phone terminal such as a smart phone is used. In another case, various PDAs (Personal Digital Assistants) such as a tablet terminal capable of connecting to the network 10 are used.

[Hardware Structure of Server]

Figure 3:
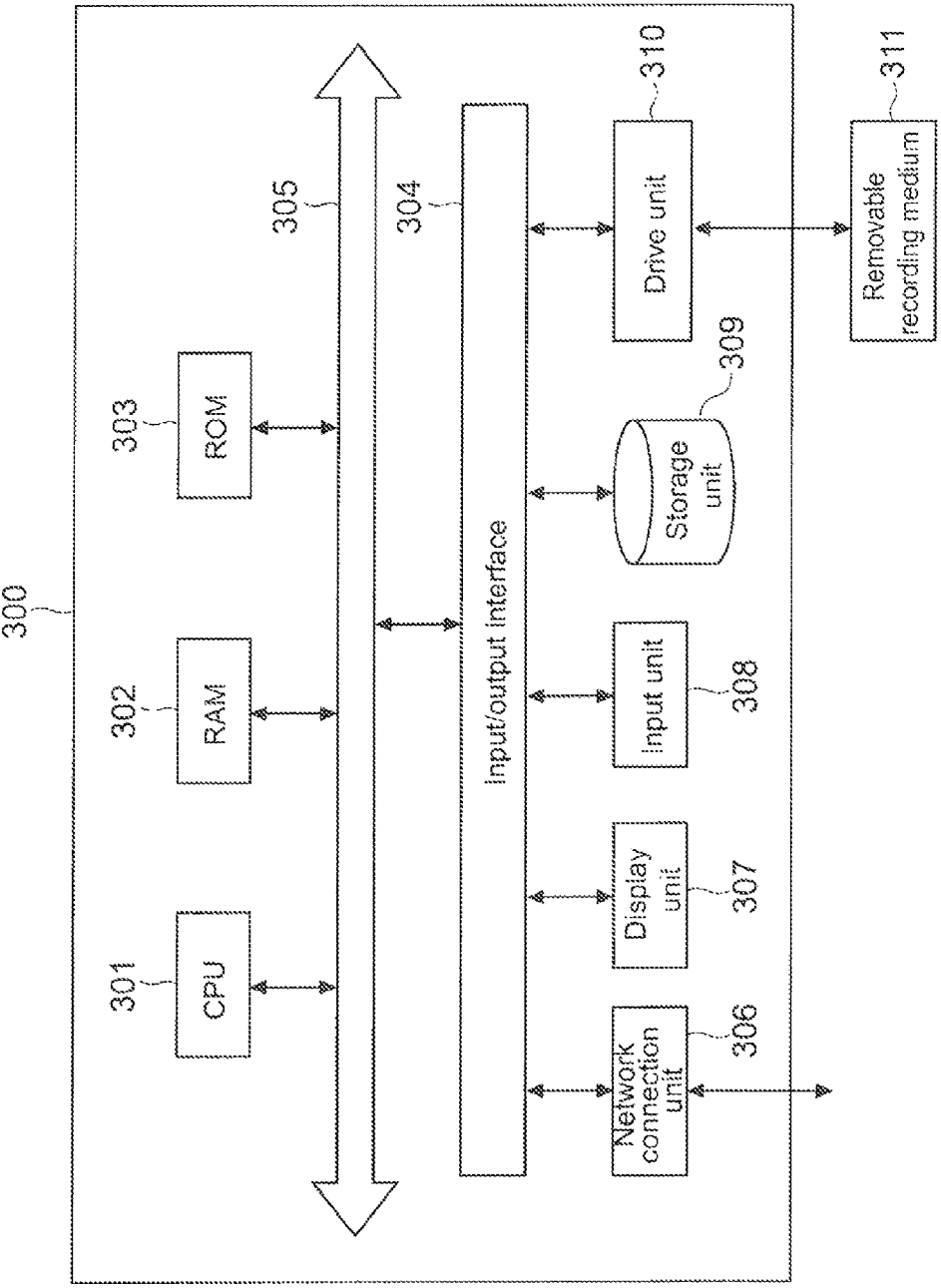
FIG. 3 is a block diagram showing an example of a hardware structure of a server shown in FIG. 1.

FIG. 3 is a block diagram showing an example of a hardware structure of a server 300 according to this embodiment. As the server 300 according to this embodiment, for example, a computer such as a PC (Personal Computer) is used.

As shown in FIG. 3, the server 300 includes a CPU 301, a RAM 302, a ROM (Read Only Memory) 303, an input/output interface 304, and a bus 305 configured to connect these devices to each other.

The CPU 301 arbitrarily accesses the RAM 302 or the like as necessary and integrally controls the whole of the respective blocks of the server 300 while performing various types of calculation processing. The ROM 303 is a non-volatile memory in which an OS (Operating System) to be executed by the CPU 301 and firmware such as a program and various parameters are statically stored. The RAM 302 is used as, for example, a work area of the CPU 301, and temporarily stores the OS, various executing applications and various types of data in process.

To the input/output interface 304, connected are a network connection unit 306, a display unit 307, an input unit 308, a storage unit 309, a drive unit 310, and the like. The display unit 307 is a display device using, for example, an LCD, an OELD, and a CRT (Cathode Ray Tube). The display unit 307 may be embedded in the server 300 or externally connected to the server 300.

The input unit 308 is, for example, a pointing device such as a mouse, a keyboard, a touch panel, or another operation device. When the input unit 308 includes a touch panel, the touch panel may be integrated with the display unit 307.

The storage unit 309 is, for example, an HDD, a flash memory, or another non-volatile memory such as a solid-state memory. In the storage unit 309, the OS, various applications and various types of data are stored. In this embodiment, a program associated with the chat application according to this embodiment is stored in the storage unit.

The drive unit 310 is a device capable of driving a removable storage medium 311 such as an optical storage medium, a floppy (registered trademark) disk, a magnetic recording tape, and a flash memory. On the other hand, the storage unit 309 is often used as a device previously installed to the server 300 that mainly to drive a non-removable storage medium. With the drive unit 310, an application program or the like may be read out from the removable storage medium 311.

The network connection unit 306 is a modem, router, or another communication device capable of connecting to the Internet that is the network 10 for communicating with another device. The network connection unit 306 may use a wired or wireless network. The network connection unit 306 may be used separately from the server 300.

Figure 4:
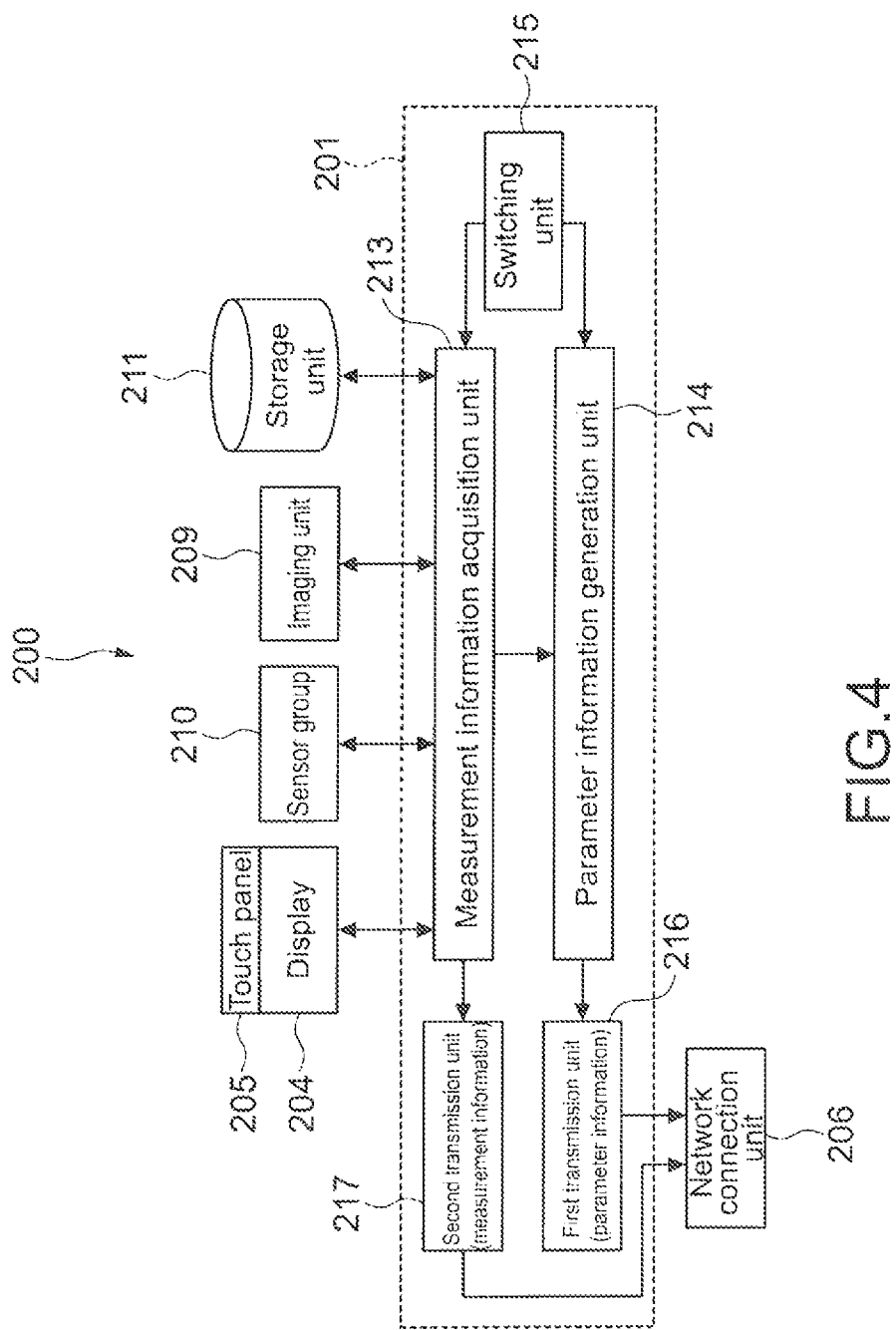
FIG. 4 is a block diagram showing a functional structure example of the portable terminal shown in FIG. 1.

FIG. 4 is a block diagram showing a functional structure example of the portable terminal 200 according to this embodiment. The respective function blocks shown in FIG. 4 are realized by cooperation between software resources such as a program stored in the flash memory 203 shown in FIG. 2 or the like and respective hardware resources such as the CPU 201.

As shown in FIG. 4, the portable terminal 200 includes a measurement information acquisition unit 213, a parameter information generation unit 214, a switching unit 215, a first transmission unit 216, and a second transmission unit 217.

The measurement information acquisition unit 213 acquires the measurement information generated by measuring states of a user. In this embodiment, a face image of the user imaged by the imaging unit 209 and position information relating to a position of the user calculated by the sensor group 210 are acquired as the measurement information.

In this embodiment, preference information of the user is acquired as the measurement information. For example, when a Web (World Wide Web) site on the Internet is browsed by a Web browser included in the portable terminal 200, the information on a Web site that is browsed many times is acquired as the preference information on the basis of browsing history of the Web site. In another case, information on a Web site registered by the user may be acquired as the preference information.

Also, content data such as an image or music stored in, for example, the storage unit 211 of the portable terminal 200 may be acquired as the preference information. Furthermore, in the chat system according to this embodiment, text data associated with comments input through the touch panel 205 may be acquired as the preference information.

The measurement information is not limited to the face image, the position information, and the preference information. Other information such as weather information, season information, and time information may be acquired as the measurement information. Furthermore, a variety of other information may be acquired as the measurement information.

The parameter information generation unit 214 generates parameter information that shows states of a user on the basis of the measurement information acquired by the measurement information acquisition unit 213. For example, in this embodiment, the parameter information relating to expressions and emotional states of the user is generated on the basis of a face image of the user.

Figure 5:
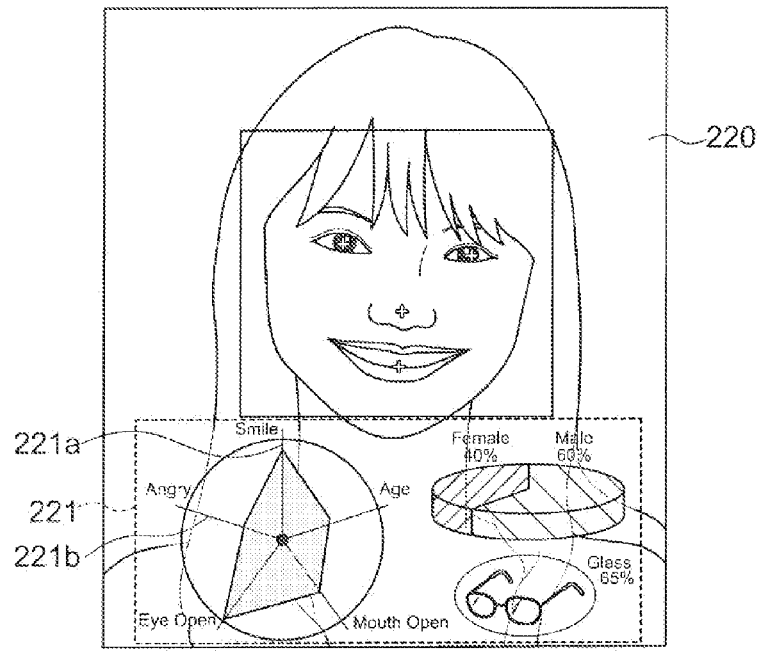
FIG. 5 is a schematic diagram showing an example of parameter information generated on the basis of a face image.

FIG. 5 is a schematic diagram showing an example of the parameter information generated on the basis of a face image 220. In the example in FIG. 5, expression parameters 221 on "smile," "angry," "male/female," "age," "eye open," "mouth open," and "glass (or possibility of wearing glasses)" are generated as the parameter information.

The parameter information is not limited thereto, but parameter information on, for example, "emotions," "hair style of user," "hair color," "skin color," "clothes," "presence or absence of accessory," "child," "adult," "elderly," "left eye open," and "right eye open" may be generated. Furthermore, a variety of other information generated from the face image 220 may be generated as the parameter information. In FIG. 5, the expression parameters 221 are displayed in a GUI, which will be described later.

The expression parameters 221 are generated by analyzing the face image 220 with, for example, a face recognition technique. For example, a "smile" expression parameter 221a is generated on the basis of an opening degree of eyes and mouth. In another case, sample images corresponding to various expressions or the like may be stored and matching processing may be performed between the imaged face image and the sample images. The expression parameters 221 may be generated in this manner.

For example, the parameter information generation processing may be performed by using "sFACE" technique of SONY Corporation. In another case, any other techniques may be used as a technique to generate the parameter information relating to expressions and emotional states of the user from the face image.

Furthermore, an image of a whole body or upper body of the user may be imaged to generate a variety of parameter information that shows states of the user on the basis of the image.

In this embodiment, the parameter information relating to a current location or moving state of the user is generated on the basis of the position information of the user by the parameter information generation unit 214. The parameter information relating to the current location may include, for example, "ocean," "mountain," "Mt. Fuji," and "Tokyo Sky Tree."

The parameter information relating to the moving state may include, for example, "not moving (standing)," "sitting," "walking," "running," "riding in a car," and "riding on a train." In another case, any other parameter information may be generated.

In order to generate the parameter information, various techniques may be used based on sensor values of a GPS, acceleration sensor, and the like included in the sensor group 210 shown in FIG. 2. For example, the parameter information is generated from a change of the position information, route information calculated by referring to map information, and the like. In another case, acceleration information in such a moving state as walking, bus, car, and train is stored. Then, the parameter information may be generated by referring to the acceleration information measured by the acceleration sensor or the like and the stored acceleration information. In another case, the information on a route map of train or bus is stored in the portable terminal 200 and the parameter information may be generated on the basis of the information.

The parameter information relating to a preference of the user is generated by the parameter information generation unit 214 on the basis of the preference information of the user. The parameter information may include information that shows an area the user is interested in such as "fashion," "gourmet," and "sports." Also, it may include information of famous people the user likes such as actors or sport players and information on unique style of the famous people.

Any other information that shows a preference of the user such as geographical names, vehicles, architectural structures, movies, paintings, music, and books may be used as the parameter information.

For example, when information on a Web site associated with a famous person with a unique hair style is acquired as the measurement information, information on the famous person or information on the unique hair style may be generated as the parameter information. In another case, when a comment on a favorite dish is acquired as the preference information of the users in the chat system, information on the dish may be acquired as the parameter information.

Also, the parameter information relating to a preference may be generated by analyzing, for example, content such as images and music stored in the storage unit 211. In another case, the parameter information may be generated on the basis of meta-data associated with the content. Various techniques may be used to generate the parameter information.

In comparison to the measurement information such as the face image and the position information, the variety of parameter information can be generated as information having a sufficiently small amount of data. Also, the amount of data of the parameter information can be sufficiently reduced compared to content data such as images, moving images, and music.

The first transmission unit 216 transmits the parameter information generated by the parameter information generation unit 214 through the network 10 to the portable terminal 200 of the communication partner. In this embodiment, the parameter information is transmitted through a server 300 to the portable terminal 200 of the communication partner.

The second transmission unit 217 transmits the measurement information acquired by the measurement information acquisition unit 213 to the server 300 through the network 10.

The switching unit 215 switches between transmission of the parameter information by the first transmission unit 216 and transmission of the measurement information by the second transmission unit 217.

Figure 6:
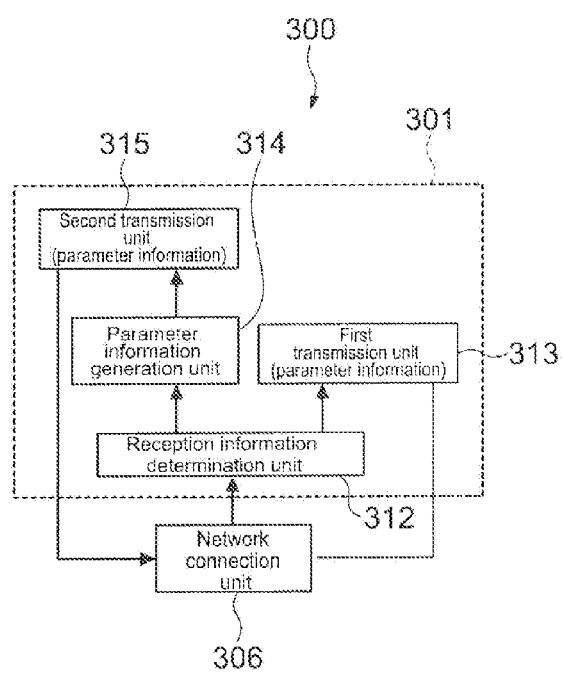
FIG. 6 is a block diagram showing a functional structure example of the server shown in FIG. 1.

FIG. 6 is a block diagram showing a functional structure example of the server 300 according to this embodiment. The respective function blocks shown in FIG. 6 are realized by cooperation of software resources such as a program stored in the storage unit 309 shown in FIG. 3 and respective hardware resources such as the CPU 301.

The server 300 includes a reception information determination unit 312, a first transmission unit 313, a parameter information generation unit 314, and a second transmission unit 315.

The reception information determination unit 312 determines whether the information transmitted from the portable terminal 200 connected through a network connection unit 306 is either the parameter information or the measurement information. When the information transmitted from the portable terminal 200 is the parameter information, the parameter information is output to the first transmission unit 313. When the measurement information is transmitted from the portable terminal 200, the measurement information is output to the parameter information generation unit 314.

The first transmission unit 313 transmits the parameter information transmitted from the portable terminal 200, to the portable terminal 200 on the communication partner side connected through the network connection unit 306.

The parameter information generation unit 314 generates the parameter information on the basis of the measurement information transmitted from the portable terminal 200. The parameter information generation processing by the parameter information generation unit 314 may be almost the same as the processing by the parameter information generation unit 214 of the portable terminal 200 shown in FIG. 4.

The second transmission unit 315 transmits the parameter information generated by the parameter information generation unit 314 to the portable terminal 200 on the communication partner side connected through the network connection unit 306.

The portable terminal 200 on a side of transmitting the parameter information and the measurement information to the server corresponds to a first information processing apparatus in this embodiment. The portable terminal 200 on a side of receiving the parameter information corresponds to a second information processing apparatus in this embodiment.

<Operation of Network System>

A description will be given of operation of the network system 100, the portable terminals 200 as the first and second information processing apparatuses, and the server 300 according to this embodiment.

Firstly, a description will be given of an outline of the chat system that is realized by the network system. In the following description, an example will be given in which a user A having a portable terminal 200A shown in FIG. 1 and a user B having another portable terminal 200B communicate by using the chat application.

Figure 7:
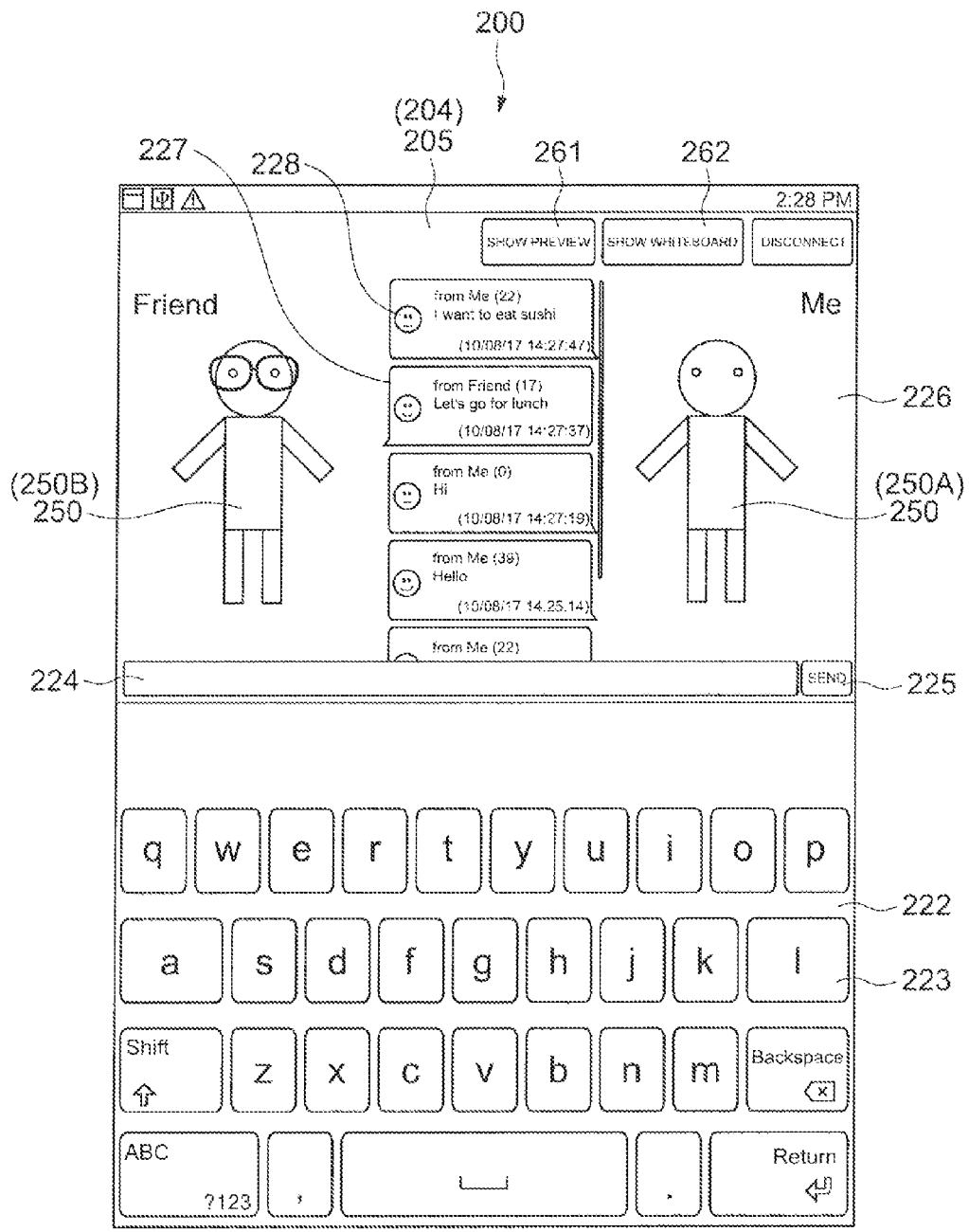
FIG. 7 is a schematic diagram showing a GUI used in a chat system according to this embodiment.

FIG. 7 is a schematic diagram showing a GUI used in the chat system according to this embodiment. The GUI is displayed on the touch panels 205 (displays 204) of both the portable terminals 200A and 200B. The GUI shown in FIG. 7 is a GUI displayed on the touch panel 205 of the portable terminal 200A.

In this embodiment, a keyboard 223 to input text data is displayed in a lower area 222 of the touch panel 205 of the portable terminal 200A. Using the keyboard 223, text data that is a comment of the user A is input. Then, the comment is displayed in an input window 224 positioned in a center of the touch panel 205.

When a transmission button 225 positioned on a side of the input window 224 is pressed, the text data is transmitted to the network 10. Then, a comment is displayed in a chat window 227 positioned in a center of an upper area 226 of the touch panel 205. In this embodiment, a text showing transmission date/time and a sender, and a face icon 228 imitating expression of the sender are displayed in the chat window 227 together with the comment.

As shown in FIG. 7, avatars 250 are displayed in positions of both sides of the chat window 227. At a position on a right side of the chat window 227 in FIG. 7, an avatar 250A that imitates the user A using the portable terminal 200A is displayed. At a position on a left side of the chat window 227, an avatar 250B that imitates the user B with the portable terminal 200B of the communication partner is displayed.

Figure 8:
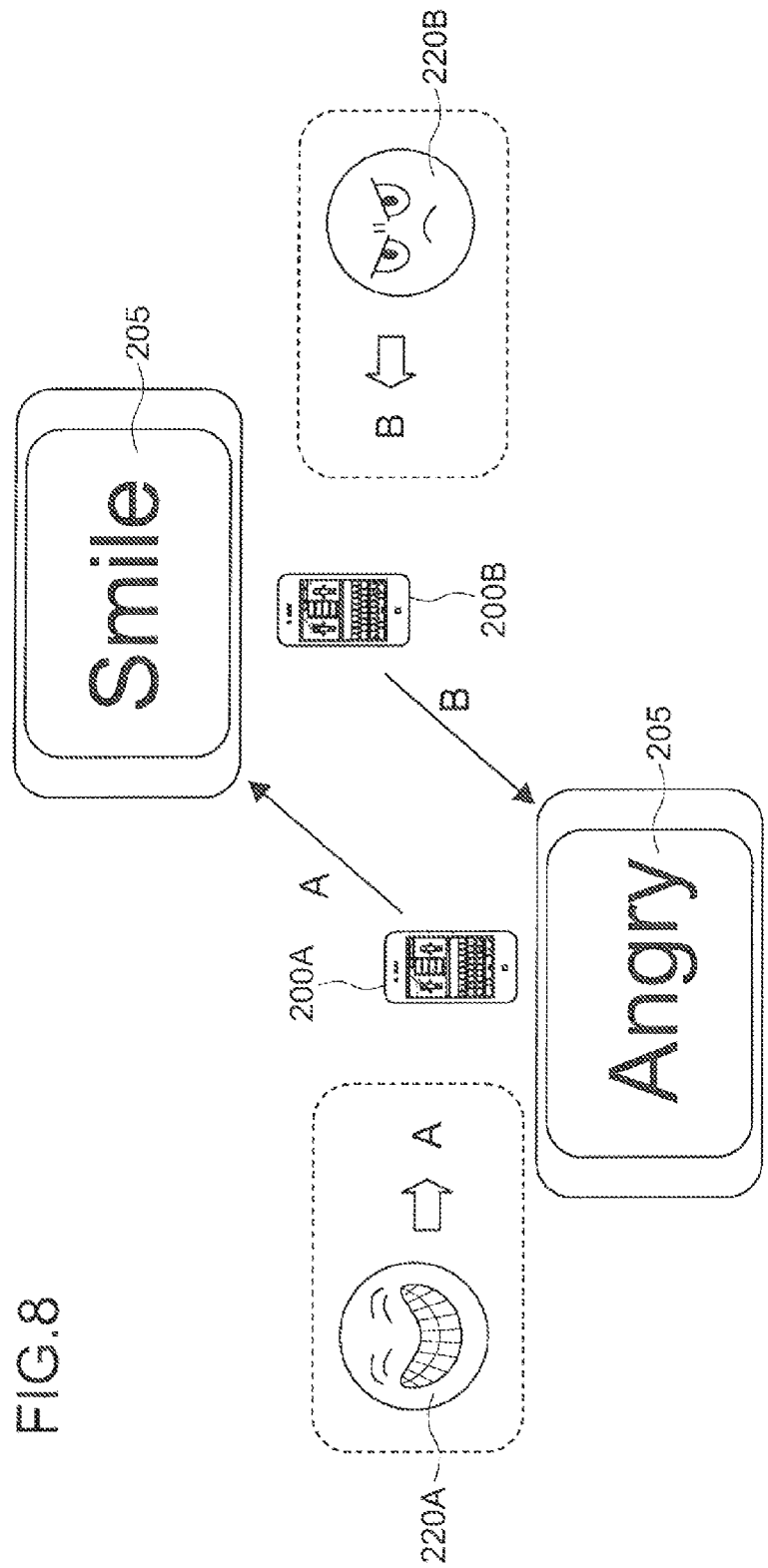
FIG. 8 is a schematic diagram for explaining an outline of the chat system according to this embodiment.

FIG. 8 is a schematic diagram for explaining an outline of the chat system according to this embodiment. For example, a face image 220A of the user A is imaged by the imaging unit 209 of the portable terminal 200A. Then, parameter information A associated with expressions and emotional states is generated from the face image 220A as the measurement information.

Now, the user A is assumed to be in a "smile" state. In this case, the parameter information A on "smile" is generated on the basis of the face image 220A of the user A. For example, a "smile" expression parameter 221a of a plurality of expression parameters shown in FIG. 5 is transmitted as having a high value. The generated parameter information A is transmitted through the server 300 to the portable terminal 200B of the communication partner.

In the portable terminal 200B (user B) receiving the parameter information A on "smile," an image that reflects a "smile" state of the user A is generated. In this embodiment, the avatar 250 in a "smile" state is displayed on the touch panel 205 of the portable terminal 200B as an avatar of the user A.

Also on the portable terminal 200B side, a face image 220B of the user B is imaged and parameter information B is generated on the basis of the face image 220B. When the user B is in an "angry" state, the parameter information B on "angry" is generated. For example, an "angry" expression parameter 221b of a plurality of expression parameters 221 shown in FIG. 5 is transmitted as having a high value. When the "angry" expression parameter 221b is not generated, for example, the "smile" expression parameter 221a may be transmitted as having almost 0. When the "smile" expression parameter 221a has an intermediate value, "no expression" may be set as a state of the user. Such settings can be arbitrarily set.

The parameter information on "angry" B is transmitted to the portable terminal 200A. Then, in the portable terminal 200A (user A) receiving the parameter information B on "angry," an image that reflects an "angry" state of the user B is generated. It means the avatar 250 in an "angry" state is displayed as an avatar of the user B.

As a result, on the touch panel 205 of the portable terminal 200A, the avatar 250A of the user is displayed in a "smile" state and the avatar of the partner 250B is displayed in an "angry" state. On the touch panel 205 of the portable terminal 200B of the communication partner, the avatar 250A of the user is displayed in an "angry" state, and the avatar 250B of the partner is displayed in a "smile" state.

Figure 9:
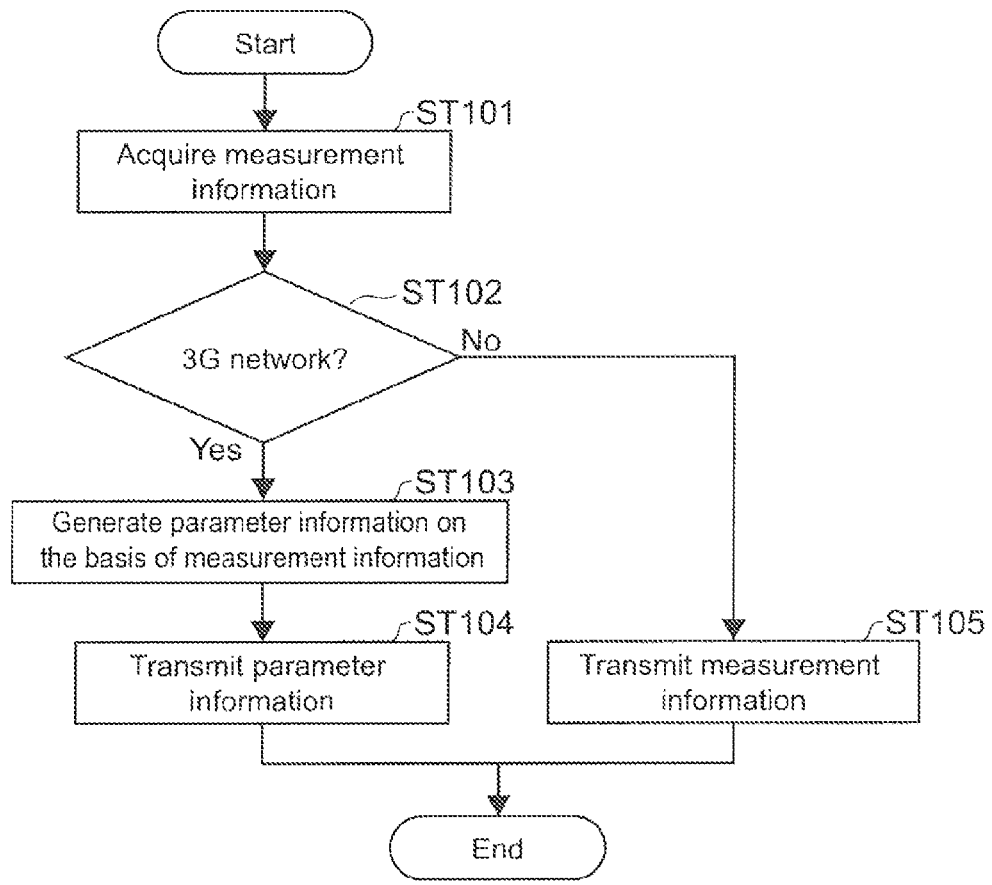
FIG. 9 is a flowchart schematically showing operation of a portable terminal as a first information processing apparatus capable of transmitting parameter information and measurement information.

FIG. 9 is a flowchart schematically showing operation of the portable terminal 200A as the first information processing apparatus capable of transmitting the parameter information and the measurement information.

With the measurement information acquisition unit 213, the measurement information generated by measuring states of the user A is acquired (step 101). A current network line is determined by the switching unit 215. That is, it is determined either a 3G network or wireless LAN communication is used for connection through the network 10 to the server 300 (step 102).

In general, a 3G network has a larger usable area, compared to wireless LAN communication. On the other hand, the thickness (width of communication bandwidth) of wireless LAN communication is thicker than that of a 3G network. Therefore, wireless LAN communication is capable of higher-speed data communication. That is, a 3G network has larger communication load to a large amount of communication traffic.

In data communication using a 3G network, as a charging system for the data communication (packet communication), a meter-rate charging system, flat-rate and meter-rate charging system, or meter-rate with upper limit charging system is applied in many cases. The meter-rate charging system is a system in which charging is performed depending on data communication amount or network line use time. The flat-rate and meter-rate charging system is a system in which a fixed amount is charged up to predetermined data communication amount or predetermined use time, and fees are charged for additional use by a meter-rate charging system. The meter-rate with upper limit charging system is a system in which an upper limit of charging amount is set and the charging amount does not exceed the limit.

When communication traffic increases on a 3G network applying such a charging system, a financial burden is likely imposed on a user. Even when a meter-rate with upper limit charging system is applied, the charging amount easily reaches the upper limit.

In data communication using wireless LAN communication, only provider contract amount is charged and there is no further charge on data communication (packet communication) in many cases. Therefore, when wireless LAN communication is used, a financial burden due to a large amount of traffic is rarely considered.

In step 102, when it is determined a 3G network is used for connection through the network 10 to the server 300 (Yes in step 102), the switching unit 215 shown in FIG. 4 selects transmission of the parameter information by the first transmission unit 216.

As a result, the parameter information is generated by the parameter information generation unit 214 on the basis of the measurement information (step 103). In comparison to the face image or position information, the parameter information is information having a sufficiently small amount of data. The generated parameter information is transmitted from the first transmission unit 216 through the server 300 to the portable terminal 200B of the communication partner (step 104).

In step 102, when it is determined a 3G network is not used for connection through the network 10 to the server 300 (No in step 102), the switching unit 215 selects transmission of the measurement information by the second transmission unit 217. As a result, the measurement information is transmitted to the server 300 by the second transmission unit 217 (step 105). In this embodiment, communication load on the network 10 is small regarding transmission of the measurement information by wireless LAN communication.

Figure 10:
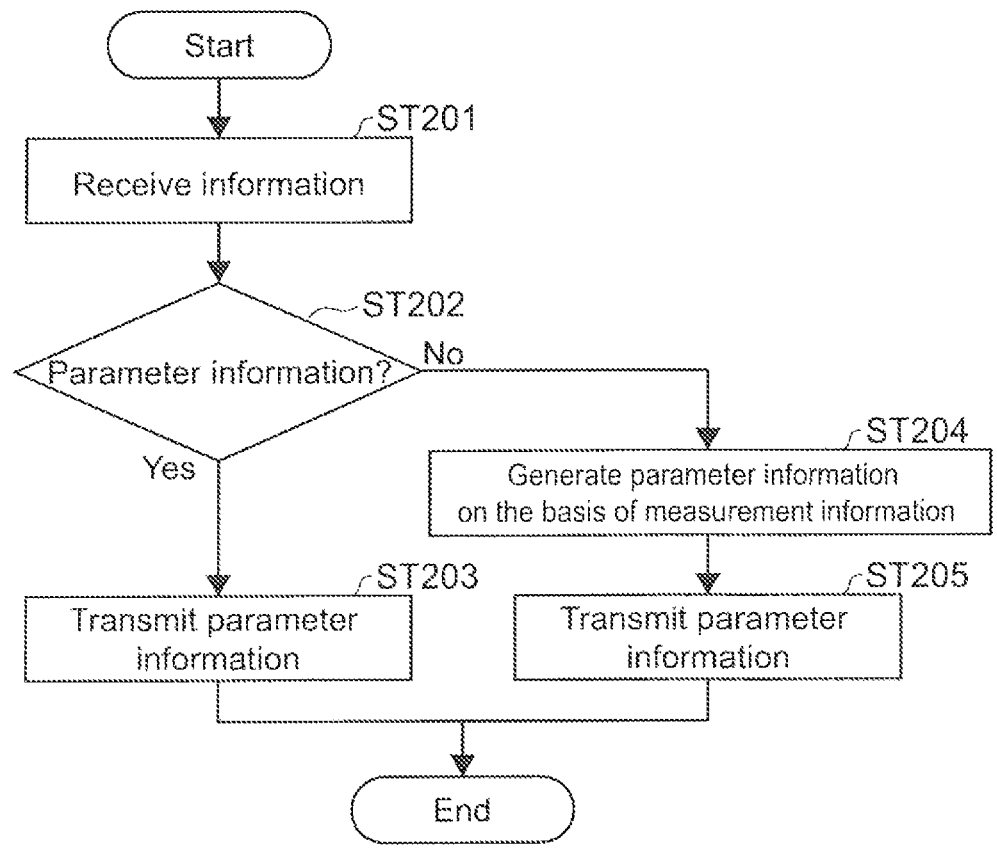
FIG. 10 is a flowchart schematically showing operation of the server shown in FIG. 1.

FIG. 10 is a flowchart schematically showing operation of the server 300 according to this embodiment. In the reception information determination unit 312 shown in FIG. 6, information transmitted from the portable terminal 200A is received (step 201), and it is determined whether the received information is the parameter information (step 202).

When it is determined the received information is the parameter information (Yes in step 202), the parameter information is transmitted from the first transmission unit 313 to the portable terminal 200B of the communication partner (step 203).

When it is determined the received information is not the parameter information (No in step 202), the parameter information is generated by the parameter information generation unit 314 on the basis of the measurement information transmitted from the portable terminal 200A (step 204). Then, the parameter information is transmitted to the portable terminal 200B of the communication partner by the second transmission unit 315 (step 205).

FIGS. 11 to 14 are schematic diagrams showing examples of user state images generated by the portable terminal 200B receiving the parameter information. The user state images are images that reflect states of the user A and are images generated on the basis of the received parameter information.

In this embodiment, a plurality of user state images are stored in the storage unit 211 shown in FIG. 2. The user state images are read out by the CPU 201 on the basis of the received parameter information. That means, in this embodiment, the CPU 201 functions as an information processing unit.

A method of processing for reading out user state images by using the parameter information and a technique for reading out the user state images are not especially limited, and a well-known technique may be used. Similarly, a method for associating the parameter information with the user state images, techniques therefor, and the like are not especially limited, and a well-known technique may be used.

The CPU 201 may include a function to create an image using, for example, a polygon as an image creation unit. Also, user state images may be arbitrarily created on the basis of the parameter information.

FIGS. 11 and 12 are schematic diagrams showing examples of the user state images generated on the basis of the parameter information relating to expressions and emotional states of the user A.

Figures 11A, 11B, 11C, 11D:
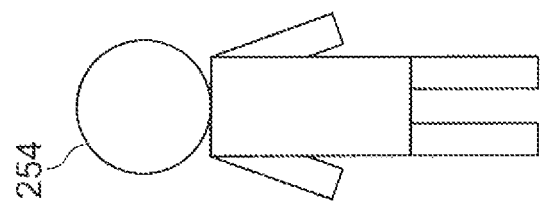
FIGS. 11A to 11D are schematic diagrams showing examples of user state images generated on the basis of parameter information relating to expressions and emotional states of a user.

FIG. 11A shows an avatar 251 that reflects a "small smile" state of a user that is generated on the basis of the parameter information on "small smile." FIG. 11B shows an avatar 252 that reflects a "big smile" state of a user that is generated on the basis of the parameter information on "big smile." The avatar 251 in FIG. 11A appears happy, and the avatar 252 in FIG. 11B appears very happy.

FIG. 11C shows an avatar 253 that reflects a "glasses wearing" state of a user generated on the basis of the parameter information on "glasses on." FIG. 11D shows an avatar 254 without receiving the parameter information relating to expressions and emotional states.

In FIGS. 12A to 12F, face icons 228A to 228F are generated by imitating expressions of the sender as user state images. The icons 228A to 228F are displayed in the chat window 227 (refer to FIG. 7).

In this embodiment, the face icons 228A to 228F are generated as user state images on the basis of the "smile" expression parameter 221a shown in FIG. 5. A relationship between the face icons 228A to 228F shown in FIG. 12 and values of the expression parameter 221a is as follows.

| | |
|---|---|
| Icon 228A in FIG. 12A | Smile expression parameter (0 to 10) |
| Icon 228B in FIG. 12B | Smile expression parameter (11 to 30) |
| Icon 228C in FIG. 12C | Smile expression parameter (31 to 50) |
| Icon 228D in FIG. 12D | Smile expression parameter (51 to 70) |
| Icon 228E in FIG. 12E | Smile expression parameter (71 to 90) |
| Icon 228F in FIG. 12F | Smile expression parameter (91 to 100) |

In this embodiment, a value of the "smile" expression parameter 221a is displayed in the chat window 227.

As described above, an image other than an avatar may be generated as a user state image. Besides the face icons 228, a GUI that shows raining, for example, may be generated as a user state image based on the parameter information on "sad." The GUI may be displayed behind an avatar as a background image. Similarly, a background image that shows blue sky with a big sun may be generated as a user state image based on the parameter information on "happy."

On the basis of the parameter information, settings of size and color of a text displayed as a comment may be arbitrarily performed. For example, when the parameter information on "happy" is received, the text input at this time is displayed on a large scale and colored with a bright color such as red. On the other hand, when the parameter information on "sad" is received, the text input at this time is displayed on a small scale and is colored with a dark color such as gray. Such settings may be performed.

FIG. 13 are schematic diagrams showing examples of user state images generated on the basis of the parameter information relating to a current location and a moving state of the user A.

Figure 13C:
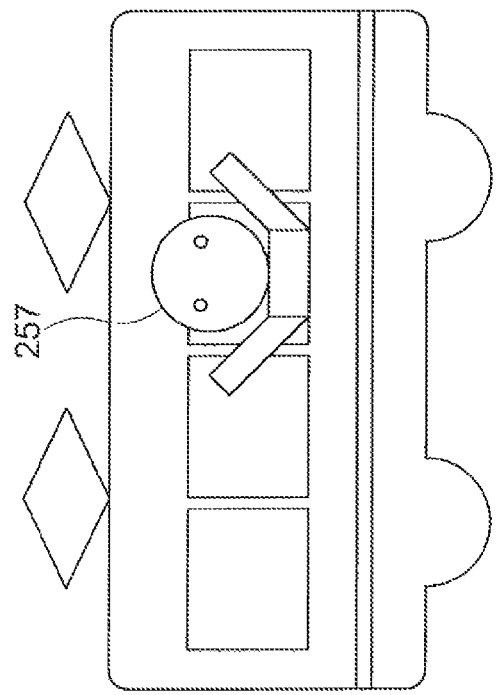
FIGS. 13A to 13C are schematic diagrams showing examples of user state images generated on the basis of parameter information relating to a current location and a moving state of a user.
Figure 13B:
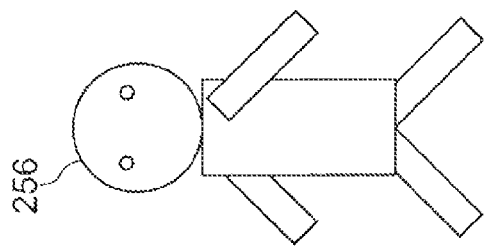
Figure 13A:
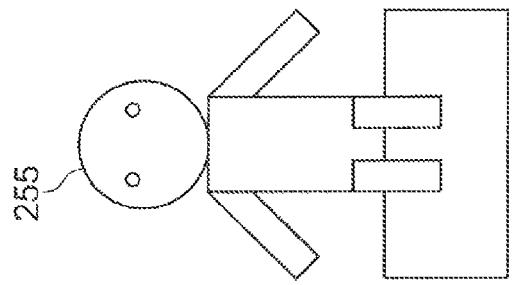

FIG. 13A shows an avatar 255 that reflects a user state on "sitting" generated on the basis of the parameter information on "sitting." FIG. 13B shows an avatar 256 that reflects a "walking" state of a user generated on the basis of the parameter information on "walking." FIG. 13C shows an avatar 257 that reflects a user state on "riding on a train" generated on the basis of the parameter information on "riding on a train."

FIG. 14 are schematic diagrams showing examples of user state images generated on the basis of the parameter information relating to a preference of the user A.

Figure 14C:
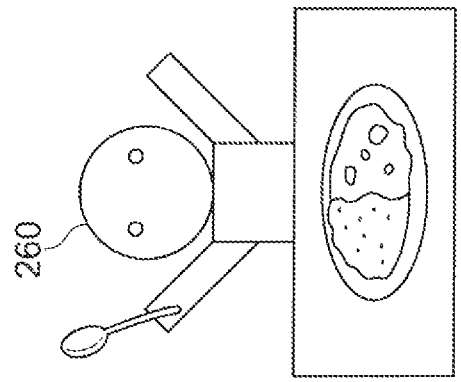
FIGS. 14A to 14C are schematic diagrams showing examples of user state images generated on the basis of parameter information relating to a preference of a user.
Figure 14B:
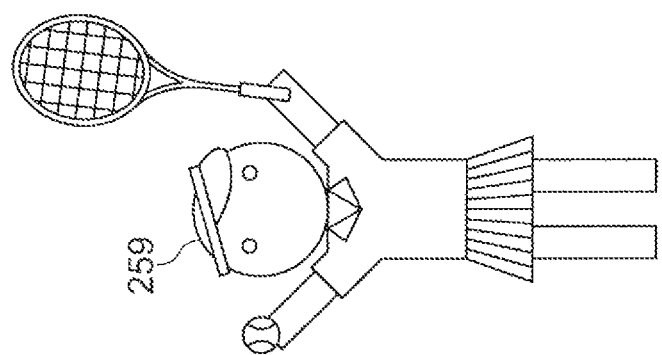
Figure 14A:
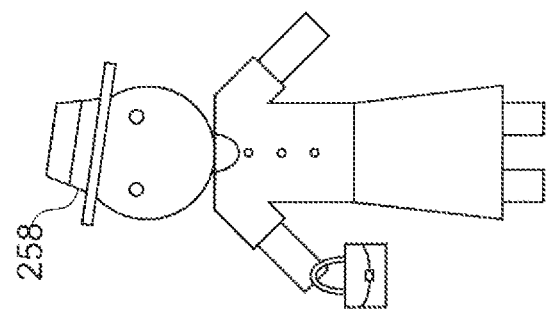

FIG. 14A is an avatar 258 that wears clothes generated as a user state image on the basis of the parameter information that shows a field of "fashion" in which the user is interested. The avatar 258 may be generated, for example, on the basis of the detailed parameter information that shows what kind of fashion the user likes.

FIG. 14B is an avatar 259 that wears a sportswear generated as a user state image on the basis of the parameter information that shows a field of "sports" in which the user is interested. The avatar 259 may be generated on the basis of the detailed parameter information that shows a kind of sports such as tennis.

FIG. 14C is an avatar 260 that sits at a table on which a dish is placed generated as a user state image on the basis of the parameter information that shows a field of "gourmet" in which the user is interested. The avatar 260 may be generated on the basis of the detailed parameter information that shows a type of dish such as curry rice.

An image generated by combining user state images shown in FIGS. 11 to 14 may be generated. For example, a user state image may be generated on the basis of the parameter information on "happy," the parameter information on "glasses on," and the parameter information on "riding on a train." As an example of such an image, an image of the avatar 257 that wears glasses shown in FIG. 13C may be generated.

On the basis of the parameter information, for example, an avatar may be jumping or rounding. That is, behavior of an avatar may be configured by reflecting emotional states of the user and the like. When a comment displayed in the chat window 227 is acquired as preference information, the content of the input comment may be reflected on the behavior of the avatar in real time.

As described above, in the portable terminal 200A that is an information processing apparatus according to this embodiment, the parameter information that shows states of the user A is generated. Then, the parameter information is transmitted through the network 10 to the portable terminal 200B that is an information processing apparatus of a communication partner. The portable terminal 200B of the communication partner is capable of generating a user state image such as an avatar that reflects states of the user A on the basis of the received parameter information.

As described above, the parameter information that shows states of the user A is generated on the basis of the measurement information such as the face image and position information. At this time, the parameter information can be generated so as to have a sufficiently smaller amount of data, compared to the measurement information. Also, in comparison to content data such as the face image and imaged moving image, the parameter information having a sufficiently small amount of data can be generated.

As a result, when the portable terminal 200A uses a 3G network, communication load on the 3G network can be suppressed. Also, a financial burden can be prevented from being imposed on the user A. That is, satisfactory communication while suppressing communication traffic can be realized by using the parameter information that shows states of the user A as in this embodiment.

The portable terminal 200A according to this embodiment includes the first transmission unit 216 configured to transmit the parameter information and the second transmission unit 217 configured to the measurement information. The first transmission unit 216 and the second transmission unit 217 are switched to each other. For example, when a communication line of a network line used by the portable terminal 200A is thick (bandwidth is wide) and the communication load causes no problem as in the above-mentioned wireless LAN communication, the measurement information is transmitted to the server 300. Then, the parameter information is generated by the server 300 on the basis of the measurement information and the parameter information is transmitted to the portable terminal 200B of the communication partner.

That is, in this embodiment, under predetermined conditions, the parameter generation processing by the portable terminal 200A can be performed by the server 300. That can reduce processing load of the portable terminal 200A and, for example, battery consumption of the portable terminal 200A can be suppressed.

In the chat system in this embodiment, high UX (User Experience) can be provided in so-called lightweight communication. That is, rich communication can be realized in the lightweight communication by transmitting/receiving the lightweight parameter information instead of content having a large amount of data such as moving images.

Thus, it is possible to realize enjoyable communication that reflects user's own emotions and the like without inputting pictograms together with a text. Also, satisfactory communication that reflects user's own emotions can be realized without the communication partner seeing the user who wears no makeup at home, for example. Furthermore, even when a low-quality network is used, satisfactory communication can be realized due to the lightweight communication.

In this embodiment, communication that reflects user's own emotions can be realized, even when a face should not be exposed in terms of privacy protection or voice should not be let out in a train. That is, network communication having real-time property, anonymity, and expressive power can be realized.

The portable terminal 200 and the server 300 according to this embodiment may be structured by installing a program that structures software for executing a series of processing described above in a computer that has a hardware structure shown in FIG. 2 and FIG. 3. The program is installed in a computer from, for example, a storage medium. In another case, it may be installed through a global network or the like. Furthermore, a computer that has dedicated hardware in which the program that structures software is embedded may be used as the portable terminal 200 and the server 300.

<Modification Example>

Embodiments according to the present technology are not limited to the above-mentioned embodiment, but variously modified. Also, various functions may be added to the chat system according to the above-mentioned embodiment.

example, FIG. 15 is a table for explaining a modification example of the parameter information that shows states of a user.

In the above-mentioned embodiment, expression parameters and the like are generated from the measurement information such as the face image, position information, or preference information as the parameter information. In the modification example shown in FIG. 15, expression parameters generated from the measurement information such as the face image, position information, or preference information are analyzed to determine states of the user. For example, the emotional state of the user such as "smiling," "angry," or "crying" is determined from the face image. The moving state of the user such as "sitting," "walking," or "train" is determined from the position information. The preference of the user such as "fashion," "sports," or "gourmet" is determined from the preference information.

Corresponding to the user states, parameter information A to I is generated. In another case, table information that shows correspondences between the user states and the parameter information A to I is stored. When the states of the user are determined from the measurement information, the parameter information A to I may be read out from the table information.

In an information processing apparatus of a communication partner, user state images corresponding to the parameter information A to I are stored. Then, the user state images are read out on the basis of the received parameter information A to I. It reduces a load on the generation processing of the user state images.

As described above, in this modification example, the parameter information A to I is generated as information for associating states of a user with a plurality of pieces of image information that expresses the states of the user. Therefore, any information may be used as the parameter information A to I, as long as the association can be performed. For example, numbers may be simply used as the parameter information A to I. In comparison to the measurement information such as the face image or position information, the parameter information A to I having a sufficiently small amount of data can be generated.

In another case, the parameter information described in the above embodiment such as the expression parameter is transmitted from an information processing apparatus on the sender side. Then, a user state shown in FIG. 15 is determined by a server, and the parameter information A to I corresponding to the user state is generated. On the receiver side, a user state image corresponding to the parameter information A to I is read out. It can reduce processing loads on both the information processing apparatuses on the sender and receiver sides. Furthermore, for example, update processing of a chat application can be mainly performed on the server side. For example, the update processing includes update processing of a use method for the expression parameters.

Figure 16:
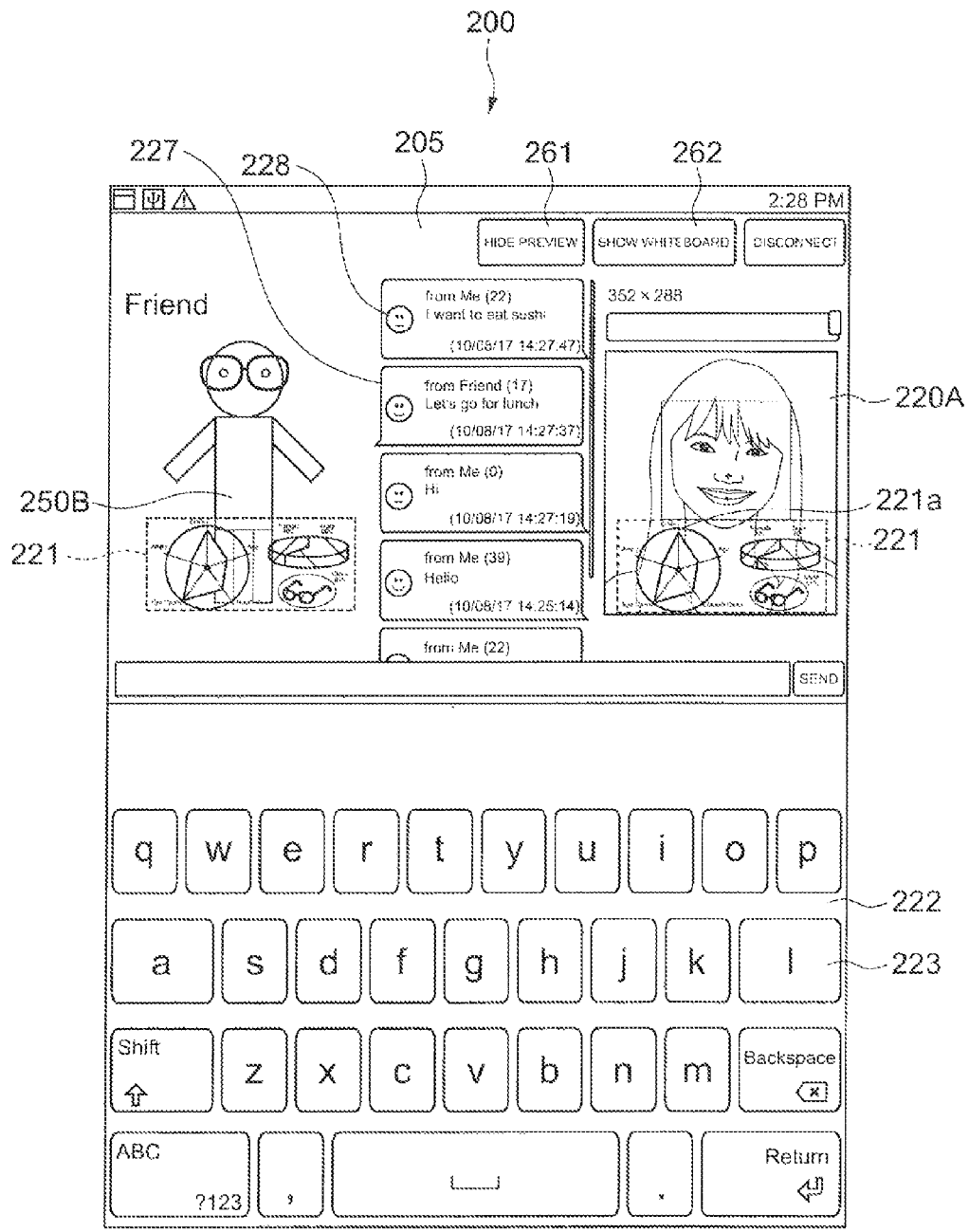
FIG. 16 is a schematic diagram for explaining a function applicable in the chat system according to this embodiment.

FIG. 16 is a schematic diagram for explaining a function applicable in the chat system described in the above embodiment.

For example, a preview button 261 placed on the upper side of the chat window 227 shown in FIG. 7 is pressed. Then, as shown in FIG. 16, the user's own face image 220A and the expression parameters 221 as the parameter information generated from the face image 220A are displayed at a position where the user's own avatar 250A has been displayed.

It allows a user to check what kind of information is transmitted to an information processing apparatus of a communication partner as the parameter information that shows a user's own state. In another case, when the user's own avatar 250A is not the desired one, which is the case where, for example, the user is smiling but the avatar corresponding to the smile is not displayed, the parameter information can be checked.

The user may be allowed to change the displayed parameter information. For example, the "smile" expression parameter 221a may be set to be a maximum value. In another case, some users wear glasses at home where the chat system is used and wear contact lenses when not in their home. These users may not want the own avatar 250A to wear glasses. In this case, the avatar 250A without glasses can be displayed by setting a "glasses off (or no possibility of wearing glasses)" parameter by themselves. Furthermore, the set parameter information may be stored as default settings.

As shown in FIG. 16, the expression parameters 221 on the partner side may be displayed on the own touch panel 205. Also, the expression parameters 221 on the partner side may be allowed to be changed.

As described above, not only user state images generated on the basis of the parameter information but also the parameter information itself may be displayed. Other information than the expression parameters 221 shown in FIG. 16 such as parameter information relating to a current location or moving state of the user and parameter information relating to the preference of the user may be displayed. And such parameter information may be allowed to be arbitrarily changed. The GUI showing the parameter information is not limited to the ones shown in FIG. 5 and FIG. 16, and can be arbitrarily set.

Figure 17:
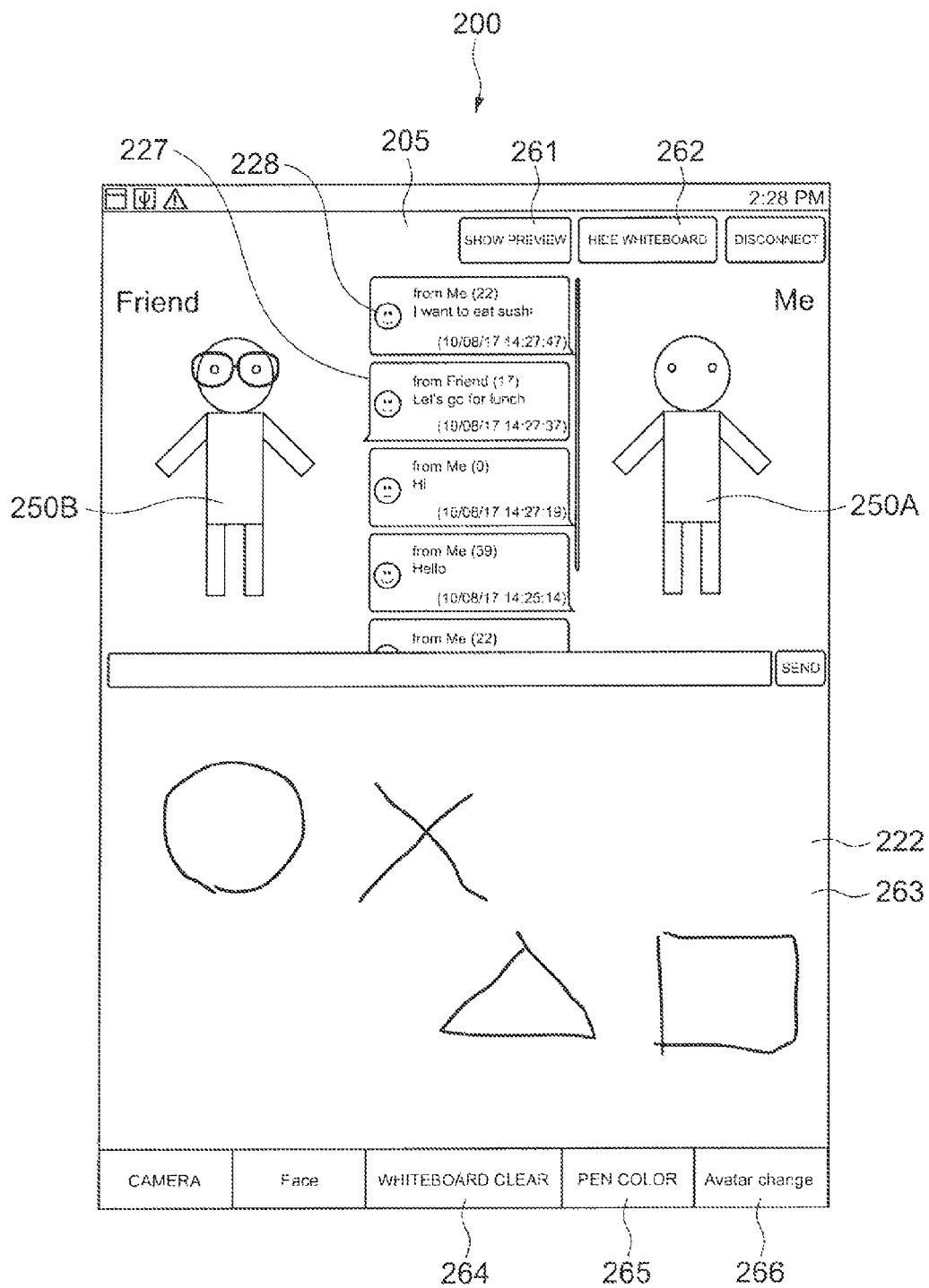
FIG. 17 is a schematic diagram for explaining a function applicable in the chat system according to this embodiment.

FIG. 17 is a schematic diagram for explaining a function applicable in the chat system described in the above embodiment.

For example, a white board button 262 placed on the upper side of the chat window 227 shown in FIG. 7 is pressed. Then, as shown in FIG. 17, the lower side area 222 of the touch panel 205 in which the keyboard 223 has been displayed becomes a white board area 263. The white board area 263 is shared with both sides of users in communication. That is, texts and pictures input through the touch panel 205 by each user are displayed on the white board areas 263 of the touch panels 205 on the both sides.

For example, texts and pictures input to the white board area 263 may be acquired as the preference information of the user. Then, the parameter information relating to the preference of the user may be generated from the acquired information and may be used for generating a user state image.

As shown in FIG. 17, a clear button 264 for erasing, for example, a text input to the white board area 263 and a color button 265 for specifying color of characters or lines at the time of inputting a text and the like are arranged at the bottom part of the white board area 263.

An avatar change button 266 is arranged on a side of the color button 265. The own avatar 250A or the avatar 250B of the partner can be changed by pressing the avatar change button 266. As described above, the avatars 250A and 250B can be changed by arbitrarily changing the parameter information, and also the avatars 250A and 250B can be directly changed.

Furthermore, it is also possible to move a displayed avatar. For example, an arm part of the own avatar or the avatar of the partner is touched and dragged upward. This operation raises both arms of the avatar. The motion of the avatar is also reflected on an avatar displayed on a touch panel of the communication partner. Thus, the satisfactory communication can be realized.

The motion of an avatar may be associated with the parameter information. For example, when arms of the avatar are raised and the avatar 252 that reflects the "big smile" state shown in FIG. 11B is displayed, the "smile" expression parameter 221a may be changed to have a large value.

In FIG. 7, the own name is Me and the partner's name is Friend. However, the names are not limited thereto and user names that are individually registered or input may be displayed. In another case, IP addresses of the respective portable terminals 200 may be displayed as the user names.

In the above-mentioned embodiment, the portable terminal 200 includes the switching unit 215 capable of switching between transmission of the parameter information and transmission of the measurement information. As an embodiment of the present technology, however, a portable terminal without the switching unit 215 is also conceivable. That is, a portable terminal capable of transmitting only the parameter information in the chat system may also be applicable as an embodiment of the present technology.

In the above description, the measurement information such as the face image, position information, or preference information is acquired to generate the parameter information from the measurement information. With this configuration, the satisfactory communication is realized. However, the parameter information is not limited to be generated from the measurement information. For example, information generated from input operation by a user or information stored in the storage unit may be generated as the parameter information as it is.

An information processing apparatus on a sender side and an information processing apparatus on a receiver side are PtoP (peer-to-peer) connected through a network. Also in this case, the present technology described above is applicable. For example, the parameter information only needs to be transmitted from the information processing apparatus on the sender side to the information processing apparatus on the receiver side not through the server.

The chat system according to the embodiment of the present technology may be structured in, for example, a 3G network. In this case, a carrier server providing the 3G network may function as the server according to the embodiment of the present technology.

In the above-mentioned embodiment, the network connection using the 3G network and the network connection using the wireless LAN communication are provided as the examples. As described above, however, another network may be used. Also in this case, transmission of the parameter information and transmission of the measurement information may be arbitrarily switched on the basis of thickness of a used network, a charging system of communication data, or the like.

The present technology may also take the following structure.

(1) An information processing apparatus, including:
a generation unit configured to generate parameter information that shows a state of a user; and
a first transmission unit configured to transmit the generated parameter information through a network to an information processing apparatus of a communication partner capable of generating an image that reflects the state of the user on the basis of the parameter information.

(2) The information processing apparatus according to (1), further including
an acquisition unit configured to acquire measurement information generated by measuring the state of the user, in which
the generation unit generates the parameter information on the basis of the measurement information.

(3) The information processing apparatus according to (2), in which
the acquisition unit acquires a face image of the user as the measurement information, and
the generation unit generates the parameter information on the basis of the face image.

(4) The information processing apparatus according to (2) or (3), in which
the acquisition unit acquires position information of the user as the measurement information, and
the generation unit generates the parameter information on the basis of the position information.

(5) The information processing apparatus according to any one of (2) to (4), in which
the acquisition unit acquires preference information of the user as the measurement information, and
the generation unit generates the parameter information on the basis of the preference information.

(6) The information processing apparatus according to any one of (2) to (5), further including:
a second transmission unit configured to transmit the acquired measurement information through the network to a server capable of generating the parameter information on the basis of the measurement information and transmitting the parameter information through the network to the information processing apparatus of the communication partner, the first transmission unit transmitting the parameter information through the server to the information processing apparatus of the communication partner; and
a switching unit configured to switch between transmission of the parameter information by the first transmission unit and transmission of the measurement information by the second transmission unit.

(7) An information processing apparatus, including:
a network connection unit capable of connecting through a network to an information processing apparatus of a communication partner capable of generating parameter information that shows a state of a user and transmitting the parameter information; and
an information processing unit capable of receiving the parameter information transmitted from the information processing apparatus of the communication partner connected through the network to the network connection unit and generating an image that reflects the state of the user on the basis of the parameter information.

(8) A server, including:
a network connection unit capable of connecting through a network to a first information processing apparatus capable of transmitting parameter information that shows a state of a user and measurement information generated by measuring the state of the user and to a second information processing apparatus capable of generating an image that reflects the state of the user on the basis of the parameter information;
a first transmission unit configured to transmit the parameter information transmitted from the first information processing apparatus connected through the network connection unit, to the second information processing apparatus connected through the network connection unit;
a generation unit configured to generate the parameter information on the basis of the measurement information transmitted from the first information processing apparatus connected through the network connection unit; and
a second transmission unit configured to transmit the generated parameter information to the second information processing apparatus connected through the network connection unit.

(9) An information processing method, including:
generating, by a generation unit, parameter information that shows a state of a user, and
transmitting, by a transmission unit, the generated parameter information through a network to an information processing apparatus of a communication partner capable of generating an image that reflects the state of the user on the basis of the parameter information.

(10) A program that causes a computer to function as:
a generation unit configured to generate parameter information that shows a state of a user; and
a first transmission unit configured to transmit the generated parameter information through a network to an information processing apparatus of a communication partner capable of generating an image that reflects the state of the user on the basis of the parameter information.

(11) The program according to (10), that further causes the computer to function as
an acquisition unit configured to acquire measurement information generated by measuring the state of the user, in which
the generation unit generates the parameter information on the basis of the measurement information.

(12) The program according to (11), in which
the acquisition unit acquires a face image of the user as the measurement information, and
the generation unit generates the parameter information on the basis of the face image.
(13) The program according to (11) or (12), in which
the acquisition unit acquires position information of the user as the measurement information, and
the generation unit generates the parameter information on the basis of the position information.
(14) The program according to any one of (11) to (13), in which
the acquisition unit acquires preference information of the user as the measurement information, and
the generation unit generates the parameter information on the basis of the preference information.
(15) The program according to any one of (11) to (14), that further causes the computer to function as:
a second transmission unit configured to transmit the acquired measurement information through the network to a server capable of generating the parameter information on the basis of the measurement information and transmitting the parameter information through the network to the information processing apparatus of the communication partner, the first transmission unit transmitting the parameter information through the server to the information processing apparatus of the communication partner; and
a switching unit configured to switch between transmission of the parameter information by the first transmission unit and transmission of the measurement information by the second transmission unit.

The present disclosure contains subject matter related to that disclosed in Japanese Priority Patent Application JP 2011-139219 filed in the Japan Patent Office on Jun. 23, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
a processor configured to process information associated with a first user, the associated information being generated based on an image of the first user and a moving state of the first user retrieved from at least one of a camera sensor, an acceleration sensor, and a location sensor, and to generate display information based on the associated information for controlling an avatar representing the moving state of the first user and an expressive state of the first user, to display to a second user communicating with the first user the avatar with a corresponding expressive state that reflects movement of the avatar, wherein the moving state of the first user indicates a manner of how the first user is moving from one location to another; and
a parameter unit configured to provide parameter information representing the moving state of the first user based on the associated information and to be used in a chat communication between the first and second users.

2. The information processing apparatus of claim 1, wherein the parameter information includes a parameter value that represents an emotional expression of the first user and includes a parameter value representing a relative value of the emotional expression; and wherein the display information includes an indication of the parameter value.

3. The information processing apparatus of claim 1, wherein the processor includes a display control unit configured to control the display to the second user of a parameter value representing a relative value of the representation of an expressive state of the first user displayed to the second user.

4. The information processing apparatus of claim 1, further including a measurement unit configured to provide measurement information representing at least one characteristic of a captured image of the first user, the measurement information being included in the associated information.

5. The information processing apparatus of claim 4, wherein the measurement information represents a positional state of the first user.

6. The information processing apparatus of claim 4, wherein the measurement information represents a preference of the first user.

7. The information processing apparatus of claim 6, wherein the preference represents fashion, sports or gourmet preferences.

8. The information processing apparatus of claim 1, wherein the display information includes character information for controlling the display to the second user of an image having characteristics representative of the moving state of the first user; and wherein the information processing apparatus further includes an input unit configured to respond to an input from the first user to change the display to the second user of the characteristics representative of the moving state of the first user.

9. The information processing apparatus of claim 1, wherein the display information includes expression information representing a facial expression based on a captured image of the first user.

10. The information processing apparatus of claim 1, further including a transmission unit configured to transmit the display information over a network to the second user.

11. The information processing apparatus of claim 10, wherein the transmission unit is further configured to transmit a message for display by the second user; and the display information causes the representation of the moving state of the first user to be displayed to the second user at a position related to the message transmitted from the first user.

12. The information processing apparatus of claim 1, further comprising a network connection interface configured to enable communication between the first and second users.

13. A non-transitory computer readable medium having recorded thereon instructions which, when read by a processor, causes the processor:
to process information associated with a first user, the associated information being generated based on an image of the first user and a moving state of the first user retrieved from at least one of a camera sensor, an acceleration sensor, and a location sensor,
to generate display information based on the associated information for controlling an avatar representing the moving state of the first user and an expressive state of the first user, to display to a second user communicating with the first user the avatar with a corresponding expressive state that reflects movement of the avatar, wherein the moving state of the first user indicates a manner of how the first user is moving from one location to another; and to provide parameter information representing the moving state of the first user based on the associated information and to be used in a chat communication between the first and second users.

14. The medium of claim 13, wherein the parameter information includes a parameter value that represents an emotional expression of the first user and includes a parameter value representing a relative value of the emotional expression; and wherein the display information includes an indication of the parameter value.

15. The medium of claim 13, wherein the instructions cause the processor to control the display to the second user of a parameter value representing a relative value of the representation of an expressive state of the first user displayed to the second user.

16. The medium of claim 13, wherein the instructions cause the processor to provide measurement information representing at least one characteristic of a captured image of the first user, the measurement information being included in the associated information.

17. The medium of claim 16, wherein the measurement information represents a positional state of the first user.

18. The medium of claim 16, wherein the measurement information represents a preference of the first user.

19. The medium of claim 18, wherein the preference represents fashion, sports or gourmet preferences.

20. The medium of claim 13, wherein the display information includes character information for controlling the display to the second user of an image having characteristics representative of the moving state of the first user; and wherein the instructions cause the processor to respond to an input from the first user to change the display to the second user of the characteristics representative of the moving state of the first user.

21. The medium of claim 13, wherein the display information includes expression information representing a facial expression based on a captured image of the first user.

22. The medium of claim 13, wherein the instructions cause the processor to control a transmission unit to transmit the display information over a network to the second user.

23. The medium of claim 22, wherein the instructions cause the processor to control the transmission unit to transmit a message for display by the second user; and the display information causes the representation of the moving state of the first user to be displayed to the second user at a position related to the message transmitted from the first user.

* * * * *